United States Patent Office 2,935,452
Patented May 3, 1960

2,935,452
RECOVERY OF EPOXYPROPIONALDEHYDE

Donald S. La France, Concord, Harry de V. Finch, Berkeley, and George W. Hearne, Lafayette, Calif., assignors to Shell Oil Company, a corporation of Delaware No Drawing. Application December 9, 1957
Serial No. 701,343

3 Claims. (Cl. 202—46)

This invention relates to the separation of 2,3-epoxypropionaldehyde from aqueous media and especially to the recovery of this epoxyaldehyde from aqueous solutions containing dissolved salts such as are obtained in its synthesis from acrolein.

Isolation of 2,3-epoxypropionaldehyde has not heretofore been described in the literature. It can be synthesized by epoxidizing acrolein. When so produced it is obtained in an aqueous solution which contains dissolved salts and other impurities. The high reactivity of both the epoxide group and the adjacent aldehyde group makes it very difficult to recover the compound from these solutions especially as the impurities also present tend to promote reaction of the epoxyaldehyde in the solution. A separation from inorganic salts can be made by flash disillation under reduced pressure but the recoveries of the epoxypropionaldehyde are lower than are necessary for successful commercial operation due to losses of product through undesirable side reactions. Also, the low relative volatility of 2,3-epoxypropionaldehyde from water which results from hydration of the carbonyl group in aqueous solution makes it necessary to take most of the water overhead in such flash distillations so the products obtained are diluted more than is desirable for most uses.

It is an object of the present invention to provide an improved distillation method for the recovery of 2,3-epoxypropionaldehyde from aqueous solutions which avoids the foregoing difficulties. A special object of the invention is the provision of an efficient method for separating 2,3-epoxypropionaldehyde from the aqueous solutions thereof containing dissolved salts, etc. such as are obtained in the production of this epoxyaldehyde by epoxidizing acrolein. Still other objects and advantages of the new process will be apparent from the following description of the invention.

It has been found that 2,3-epoxypropionaldehyde can be successfully recovered from aqueous solutions containing dissolved salts and other impurities less volatile than this epoxyaldehyde without substantial loss through reaction and without excessive dilution with water by stripping with added steam under properly controlled conditions. In order to obtain the salt-free epoxypropionaldehyde without undue dilution with water, it is necessary to conduct the stripping operation at a temperature and pressure such that a favorable volatility ratio exists between the epoxide and the substrate. It has been found that the relative volatility of epoxypropionaldehyde in water increases as the temperature (and equilibrium pressure) is raised, as shown by the data below which was obtained with a 10% weight aqueous solution of 2,3-epoxypropionaldehyde:

| Boiling Point, °C. | Pressure, mm. Hg | Relative Volatility, alpha |
|---|---|---|
| 51 | 100 | 1.1 |
| 75 | 300 | 1.65 |
| 88 | 500 | 1.9 |

The steam stripping can thus be conducted at temperatures above 50° C. without excessive dilution of the product with water. From the standpoint of relative volatility to water, higher temperatures, particularly temperatures of 75° C. or above, are increasingly favorable. However, as the temperature is raised the rate of loss of epoxypropionaldehyde due to chemical reactions of the epoxy group or the aldehyde group, or both, becomes very much greater. This is shown below, where rates of reaction of 2,3-epoxypropionaldehyde of 12% weight concentration with water and with aqueous sodium chloride solution are tabulated.

Substrate: Water

| Temperature, °C.: | Rate of reaction of epoxide, percent/hr. |
|---|---|
| 5 | 0.017 |
| 80 | 7.9 |
| 94 | 20.8 |

Substrate: 22% sodium chloride in water

| Temperature, °C.: | Rate of reaction of epoxide, percent/min. |
|---|---|
| 50 | 3.5 |
| 70 | 6 |
| 94 | 23 |

In order to obtain good recoveries of epoxide by steam stripping it is necessary then to choose conditions giving (1) a favorable volatility ratio of the epoxide, that is temperature above about 50° C. (pressures above about 100 mm. mercury) and at the same time (2) avoid temperatures so high as to cause excessive losses of epoxide due to chemical reactions in the stripper column, that is temperatures below about 90° C. (pressures below about 550 mm. mercury).

For best results the steam stripping of the 2,3-epoxypropionaldehyde solution should be carried out with the pH of the solution controlled so that undesirable reactions of epoxyaldehyde during stripping are minimized. In general a pH within the range of about 3 to about 8 is desirable. With epoxypropionaldehyde solutions which contain substantial amounts of inorganic chlorides such as sodium chloride, say 3 to 5% or more of NaCl, it is advantageous to use a higher pH, preferably in the range of about 6 to 8, than when employing solutions substantially free of such salts in which case a pH of about 3.5 to about 7 is more suitable. For adjustment, where necessary, of the pH of the solution being purified various amounts of acid or acid salts such as sulfuric acid, phosphoric acid, sodium pyrophosphate, etc. can be added. The variation in stability at different pH values and temperatures of a sodium chloride-free 10% weight solution of epoxypropionaldehyde obtained by epoxidizing acrolein with alkaline hydrogen peroxide is shown by the following figures:

| pH of Solution | Epoxypropionaldehyde Half-Life in Hours at— | | | |
|---|---|---|---|---|
| | 25° C. | 50° C. | 70° C. | 90° C. |
| 3.0 | 150 | 16 | 3 | 0.7 |
| 4 | | | 6 | |
| 5 | | 32 | 6 | 1.3 |
| 6 | | | 5 | |
| 7 | | | 3 | |
| 7.5 | | 13 | 2.5 | 0.6 |

The time of residence of the 2,3-epoxypropionaldehyde in the stripper should be limited to not more than 10 minutes in order to repress undesirable reactions. Times of the order of about 0.5 to about 2.5 minutes are preferred.

The amount of added steam which is desirably injected in order to effect the required stripping can vary but is advantageously in the range of about 0.5 to about 1.5, more desirably about 0.75 to about 1.0 mole per mole of total 2,3-epoxypropionaldehyde plus water fed to the stripper.

In order to carry out the process of the invention, the dilute aqueous solution of the 2,3-epoxypropionaldehyde to be purified, is advantageously introduced, at a pH controlled as indicated above, into a stripping column, at an intermediate level thereof while steam is injected into the column at a lower level. Packed or tray columns, for example, are suitable for the stripping. The pressure during steam stripping is maintained between about 150 and about 550 mm. mercury absolute as previously indicated, these operating pressures being in accordance with usual practice, pressures at the column head, bottom pressures being always somewhat higher. By this method of operation the epoxypropionaldehyde solution is contacted countercurrently with added steam in the rectifying zone and a vaporous fraction of purified epoxypropionaldehyde is separated overhead from an aqueous solution of the less volatile impurities contained in the feed. This method not only eliminates any substantial loss of epoxypropionaldehyde through reaction but also avoids undesirable dilution of the epoxyaldehyde product with water. The product epoxypropionaldehyde is obtained by condensing the overhead vapor using any conventional type of condenser.

The following examples further illustrate the new process of the invention in certain of its useful embodiments.

*Example I*

A series of stripping tests were carried out in a ten plate bubble tray column with a feed of crude 2,3-epoxypropionaldehyde obtained by reacting acrolein with sodium hypochlorite solution. The crude feed contained 0.2 equivalent of 2,3-epoxypropionaldehyde per 100 ml. of solution and contained about 20% sodium chloride. The pH of the solution was adjusted to 6 and then fed to the top plate of the column while saturated steam was injected at plate 10 in a ratio of 24 moles of steam per mole of 2,3-epoxypripionaldehyde fed. The results obtained showed that the recoveries at different operating pressures would be as follows:

| Pressure at Column Head (mm. mercury absolute) | Stripping Temperature (° C.) | Recovery of Epoxypropionaldehyde (mole percent) |
|---|---|---|
| 75 | 45 | 70 |
| 118 | 55 | 80 |
| 190 | 65 | 86 |
| 230 | 70 | 85 |
| 300 | 75 | 79 |
| 450 | 85 | 67 |
| 625 | 94 | 56 |

*Example II*

Crude 2,3-epoxypropionaldehyde solution obtained by reacting acrolein with hydrogen peroxide in the presence of sodium hydroxide and containing 11.5% weight 2,3-epoxypropionaldehyde, 1.5% sodium salts and 0.7% organic impurities, the remainder being water, was steam stripped in a bubble tray column of 3 inch diameter having 19 actual plates. The solution at pH 7 to 8 was fed to plate No. 1. While superheated stripping steam at 20 p.s.i.g. in a mole ratio to feed of 0.8 was fed to plate No. 19. Maintaining a column head pressure of 500 mm. mercury corresponding to a temperature of 88° C. the recovery of 2,3-epoxypropionaldehyde, obtained as an aqueous solution of 12.2% weight concentration was 95%. The bottoms fraction contained 4% of the 2,3-epoxypropionaldehyde in the feed.

Raising the steam to feed ratio to about 1.2 gives a recovery of 2,3-epoxypropionaldehyde of 96 to 97%.

We claim as our invention:

1. A process for purifying 2,3-epoxypropionaldehyde in aqueous solution containing impurities less volatile than said epoxyaldehyde which comprises subjecting the solution to stripping with added steam at a subatmospheric pressure controlled so as to maintain the temperature of the overhead vapors between 50° C. and about 95° C., thereby separating a vaporous fraction containing purified 2,3-epoxypropionaldehyde from an aqueous solution of said less volatile impurities.

2. In a process for producing 2,3-epoxypropionaldehyde wherein an aqueous solution of said epoxyaldehyde containing by-product salts formed in the process is obtained, the method of recovering said 2,3-epoxypropionaldehyde without substantial loss through reaction or dilution thereof with water, which comprises introducing a stream of said solution at a pH between about 4 and about 8 into a rectifying zone at an intermediate level thereof, injecting steam into said zone at a level below the level of introduction of said solution, the amount of said injected steam being between about 0.5 to about 1.0 moles per mole of solution fed and the pressure being between about 150 and 550 mm. of mercury absolute whereby said solution is contacted counter-currently with the steam within said rectification zone and the temperature of the overhead vapors is between 50° C. and about 95° C.

3. In a distillation process for the recovery of 2,3-epoxypropionaldehyde, the steps comprising feeding an aqueous solution of said epoxyaldehyde from the epoxidation of acrolein containing impurities which tend to cause reaction of said epoxyaldehyde, to a stripping column with added steam in a ratio of about 0.5 to about 1.0 mole of steam per mole of said solution at a reduced pressure of between about 150 and 550 mm. of mercury maintain an acid pH in said solution of not less than about 4 whereby said solution is heated for not more than about 10 minutes and 2,3-epoxypropionaldehyde is taken off overhead in aqueous solution free from said impurities at least as concentrated in 2,3-epoxypropionaldehyde as the feed to the column.

References Cited in the file of this patent
UNITED STATES PATENTS 2,887,498    Hearne et al.    May 19, 1959

OTHER REFERENCES

Weissberger: "Distillation," published by Interscience Publishers, Inc., New York, 1951. (Pages 17, 20–23, 464, 463.)